United States Patent [19]

Aten et al.

[11] Patent Number: 5,760,151
[45] Date of Patent: Jun. 2, 1998

[54] TETRAFLUOROETHYLENE COPOLYMER

[75] Inventors: Ralph Munson Aten, Vienna; Clay Woodward Jones, Washington; Allan Harold Olson, Parkersburg, all of W. Va.

[73] Assignee: E. I. du Pont de Nemours and Company, Wilmington, Del.

[21] Appl. No.: 691,773

[22] Filed: Jan. 2, 1996

Related U.S. Application Data

[60] Provisional application No. 60/002,406, Aug. 17, 1995.
[51] Int. Cl.$^6$ .................................................. C08F 16/24
[52] U.S. Cl. ........................................................ 526/247
[58] Field of Search ............................................ 526/247

[56] References Cited

U.S. PATENT DOCUMENTS

| | | | |
|---|---|---|---|
| 32,199 | 7/1861 | Carlson | 526/206 |
| 3,528,954 | 9/1970 | Carlson | 260/87.5 |
| 3,635,926 | 1/1972 | Gresham et al. | 260/87.5 |
| 4,380,618 | 4/1983 | Khan et al. | |
| 4,743,658 | 5/1988 | Imbalzano et al. | |
| 5,176,958 | 1/1993 | Shimizu et al. | 526/247 |
| 5,266,639 | 11/1993 | Chapman, Jr. et al. | |
| 5,284,708 | 2/1994 | Shimizu et al. | 526/247 |
| 5,461,129 | 10/1995 | Kurihara et al. | 526/427 |

FOREIGN PATENT DOCUMENTS 0224037  6/1987  European Pat. Off. ............ 526/247

*Primary Examiner*—Joseph L. Schofer
*Assistant Examiner*—N. Sarofin

[57] ABSTRACT

Copolymers of tetrafluoroethylene and perfluoro(ethyl vinyl ether) having perfluoro(ethyl vinyl ether) content of at least 3 wt % exhibit excellent toughness even at melt viscosities of no greater than $25 \times 10^3$ Pa.s. The copolymers can advantageously be made by aqueous dispersion copolymerization of the monomers in the absence of alkaline buffer and preferably in the absence of organic solvent.

13 Claims, No Drawings

TETRAFLUOROETHYLENE COPOLYMER

This application is a continuation-in-part of provisional application Ser. No. 60/002,406, filed Aug. 17, 1995.

FIELD OF THE INVENTION

This invention is in the field of copolymers of tetrafluoroethylene with perfluorinated alkyl vinyl ethers.

BACKGROUND OF THE INVENTION

Melt-fabricable copolymers of tetrafluoroethylene (TFE) and perfluoro(alkyl vinyl ether) (PAVE) wherein the alkyl group contains 1 to 8 carbon atoms are disclosed in U.S. Pat. No. 3,528,954 as being prepared by polymerization in a solvent medium, preferably F-113 ($CCl_2FCClF_2$, now known as CFC-113). The only TFE/PAVE copolymer exemplified in the Examples is TFE/PPVE copolymer, PPVE being perfluoro(propyl vinyl ether).

Reissue Pat. No. 32,199 discloses these same copolymers made by solvent polymerization to have improved toughness so as to be stress crack resistant in the form of fabricated articles, this stress crack resistance being tested by MIT Flex Life. Again TFE/PPVE copolymer is the only TFE/PAVE copolymer in the Examples. This patent discloses the rearrangement of the PAVE comonomer during polymerization to terminate the polymer chain with unstable—COF end groups. The longer the polymerization reaction, as required as PAVE comonomer content increases, the greater the time for rearrangement and adverse effect on molecular weight and copolymer properties.

U.S. Pat. No. 3,635,926 discloses further improvement in toughness of TFE/PAVE copolymer. This patent discloses that the polymer properties are poorer when the copolymer is prepared in an aqueous medium instead of a solvent medium (column 2, lines 40–48). This patent uses a buffered aqueous polymerization medium which contains certain chain transfer agents to obtain the improved result. In the Examples, Table I, F-113 solvent is shown as also being present to increase polymerization rate. F-113 is also present consistent with the belief of the need for solvent to obtain good polymer properties, notably toughness, from the earlier experience with solvent-based polymerization and the poor result obtained when water was substituted for the solvent. Example II, which does not have F-113 present, is called a baseline experiment for comparison with other runs when F-113 and the desired chain transfer agent are used. In this Table, both TFE/PPVE and TFE/PEVE copolymers are disclosed, PEVE being perfluoro(ethyl vinyl ether), with no apparent distinction between them except that where comparison can be made, the PEVE content is less than the PPVE content. PEVE contents of 1.9 wt % to 2.3 wt % are disclosed.

Japanese Patent Publication 7(1995)-126329, published May 16, 1995, corresponding to U. S. Pat. No. 5,461,129, granted Oct. 24, 1995, discloses TFE/PEVE copolymers containing 1 to 10 wt % of PEVE and having a melt viscosity of $30 \times 10^4$ to $200 \times 10^4$ poise ($30 \times 10^3$ to $200 \times 10^3$ Pa.s) in order for film or sheet which is hot pressed from the copolymer to have good resistance to flex fatigue (flex life). The copolymer is made by suspension polymerization in the organic phase of a water/organic solvent medium, i.e. in the absence of dispersing agent and water-soluble initiator, and the maximum PEVE content actually obtained was 6.92 wt %.

TFE/PPVE copolymer has been the only partially crystalline TFE/PAVE copolymer which has been commercialized. The commercialization has been carried out for about the past 25 years and the product, called PFA fluoropolymer, is now available from several suppliers. This copolymer has many utilities arising from its melt-fabricability, inertness, and high use temperatures. This copolymer also has limitations on utility arising from difficulty in obtaining both high comonomer content and high molecular weight as a result of the rearrangement of the PPVE comonomer causing chain termination. This has made it difficult to serve the injection molding application to produce molded articles having high stress crack resistance; the high amount of PPVE needed for stress crack resistance gives reduced molecular weight which detracts from stress crack resistance. Even at lower PPVE contents, extrusion rates are limited because of the considerable melt viscosity of the copolymer required for copolymer toughness. This limit arises from the torque that can be delivered by the extruder or from melt fracture of the extrudate.

There has been a long felt need for TFE copolymer of similar high use temperature and inertness, but with improved melt fabrication properties, especially for extrusion, including injection molding, which are the major fabrication processes used, and without the limitations on composition and molecular weight which have limited the use of TFE/PPVE copolymer in the past. There is also a need, for environmental reasons, to be able to make the copolymer without the use of organic solvent in the polymerization medium.

Aomi et al in U.S. Pat. No. 5,064,464 disclose the problem of fine particles of submicron size in molded products of fluorine-containing resin, for example, containers for reagents used in semiconductor processing. Such particles contaminate the reagents and are deleterious to production of defect-free semiconductor devices. The '464 patent, to solve the problem, offers a multiplicity of methods for removing the fine particles from articles. A fluoropolymer resin having a substantially reduced fine particle component is desired.

SUMMARY OF THE INVENTION

It has been discovered that tetrafluoroethylene (TFE) and perfluoro(ethyl vinyl ether) (PEVE) can be advantageously copolymerized to produce melt-fabricable TFE/PEVE copolymer of high toughness, including high flex life, without the use of organic solvent and without the need for the copolymer to have a melt viscosity greater than $30 \times 10^3$ Pa.s in order for the copolymer to have high flex life. The preferred process of the present invention comprises forming a polymerization medium containing water, water-soluble polymerization initiator, and dispersing agent, and in the absence of alkaline buffer, copolymerizing TFE with PEVE to form an aqueous dispersion of melt-fabricable TFE/PEVE copolymer particles in said medium. Unexpectedly, this process yields the simultaneous increase of melt viscosity and PEVE content of the TFE/PEVE copolymer.

Another unexpected result when the aqueous dispersion polymerization is carried out in the absence of alkaline buffer is that the resultant TFE/PEVE copolymer exhibits a surprising improvement over TFE/PPVE copolymers. As described above, the PAVE comonomer which includes both PEVE and PPVE rearranges during copolymerization to terminate the growing copolymer chains with unstable end groups. It is believed that one manifestation of this premature chain termination has been the contamination of the TFE/PPVE copolymer resin with low molecular weight copolymer (oligomer) which appears as particulate on the surface of molded parts made from the copolymer resin, requiring the extra process step of removing the particles for sensitive uses. TFE/PEVE copolymers made by the process of the present invention have substantially reduced oligomer content.

Another embodiment of the present invention is certain TFE/PEVE copolymers which are melt-fabricable at high shear rates and which have high flex life even at melt viscosities of less than $30 \times 10^3$ Pa.s. Such copolymer compositions consist essentially of tetrafluoroethylene and at least 3 wt % of perfluoro(ethyl vinyl ether) and have a melt viscosity of no greater than $25 \times 10^3$ Pa.s ($25 \times 10^4$ poise) except that at compositions in which the PEVE content is greater than 10 wt %, the melt viscosity of the copolymer can exceed $25 \times 10^3$ Pa.s. The TFE/PEVE copolymer compositions of the present invention exhibit not only surprising toughness as indicated by flex life, but also surprising high temperature strength, and surprising capability for extrusion at high shear rate without gross melt fracture.

The present invention enables a large proportion of PEVE to be copolymerized with TFE, e.g., even greater than 10.5 wt % PEVE without sacrifice in copolymer stability.

DETAILED DESCRIPTION OF THE INVENTION

The TFE/PEVE copolymer of this invention contains at least 3 wt % of PEVE, as determined by an infrared spectroscopic method outlined below. As illustrated by examples to follow, such copolymer exhibits better toughness, as indicated by higher flex life, than counterpart resin containing perfluoro(methyl vinyl ether) (PMVE) in higher concentration. As also illustrated by examples to follow, TFE/PEVE copolymer of this invention remarkably can be extruded in capillary rheometry at shear rates substantially in excess, e.g., at least 2×, of the shear rates at which counterpart resin containing PPVE instead of PEVE exhibits gross melt fracture and extrudate distortion. The copolymer of the invention also exhibits higher tensile strength at high temperature than counterpart resins containing either PMVE or PPVE instead of PEVE.

PEVE content in TFE/PEVE copolymer of this invention is preferably at least 4 wt %, especially at least 8 wt %. The amount of PEVE is such that the copolymer is partially-crystalline as polymerized. By this it is meant that the heat of fusion calculated from a melting endotherm detected in a differential scanning calorimetry (DSC) scan for as-polymerized resin is at least about 3 J/g.

TFE/PEVE copolymers of this invention generally have melt viscosity (MV) in the range $0.5-50 \times 10^3$ Pa.s at 372° C. with the proviso that at PEVE contents of 10 wt % or less, the MV is no greater than $25 \times 10^3$ Pa.s. MV in the range $1-10 \times 10^3$ Pa.s is preferred, and MV in the range $1.5-5 \times 10^3$ Pa.s is most preferred. Surprisingly, the TFE/PEVE copolymers of this invention can be melt processed, e.g., by extrusion, including injection molding, at high shear rate.

The TFE/PEVE copolymers of this invention can be made by aqueous dispersion polymerization, preferably in the absence of non-aqueous solvent. Other methods that yield copolymer having generally homogeneous composition can be used.

For aqueous dispersion polymerization, a broad range of temperatures can be used. Because of heat transfer considerations and the use of thermally activated initiators, higher temperatures are advantageous, such as temperatures in the range of about 50°–100° C. Temperature in the range 70°–90° C. is preferred for making the copolymers of this invention by the aqueous semibatch process used in the examples below. Surfactants used in emulsion polymerization appear to be less effective at temperatures above 103°–108° C. and there is a tendency to lose dispersion stability.

Surfactants generally suitable for use in dispersion polymerization of TFE copolymers can be used. Such surfactants include, for example, ammonium perfluorooctanoate (C-8), ammonium perfluorononanoate (C-9), and the perfluoroalkyl ethane sulfonic acids and salts thereof disclosed in U.S. Pat. No. 4,380,618.

Initiators commonly employed in emulsion polymerization of TFE copolymers are water-soluble free-radical initiators such as ammonium persulfate (APS), potassium persulfate (KPS), or disuccinic acid peroxide, or redox systems such as those based on potassium permanganate. Such initiators can be used in aqueous processes to make the TFE/PEVE copolymers of this invention. APS and/or KPS is preferred.

Chain transfer agent (CTA) can be used in aqueous polymerization of the TFE/PEVE copolymers of this invention, and use of CTA is preferred. A wide range of compounds can be used as CTA. Such compounds include, for example, hydrogen-containing compounds such as molecular hydrogen, the lower alkanes, and lower alkanes substituted with halogen atoms. The chain transfer activity of such compounds when used in TFE/PEVE polymerization can result in copolymer having —$CF_2H$ end groups which are relatively stable. The CTA can contribute other relatively stable end groups, depending on the identity of the CTA. Preferred CTAs include methane, ethane, and substituted hydrocarbons such as methyl chloride, methylene chloride, chloroform, and carbon tetrachloride. The amount of CTA used to achieve desired molecular weight will depend, for given polymerization conditions, on the amount of initiator used and on the chain transfer efficiency of the chosen CTA. Chain transfer efficiency can vary substantially from compound to compound, and varies with temperature.

The contribution of PEVE rearrangement, which is less than PPVE rearrangement, to the formation of —COF end groups that hydrolyze to —COOH end groups can be offset by buffering the polymerization with alkaline buffering agent such as ammonium carbonate or ammonia (ammonium hydroxide). As disclosed in U.S. Pat. No. 3,635,926, such buffering results in amide end groups. In accordance with the present invention, however, it has been found that improved results are obtained when the polymerization reaction is conducted in the absence of buffer, which surprisingly results in the simultaneous increase of MV and PEVE content of the TFE/PEVE copolymer under comparable polymerization conditions. Such copolymer has been found to have substantially less oligomer (fine particle) content as evidenced by a mass spectrometer analysis as detailed in the examples below. This analysis is made in terms of an ion mass derived from the side chain of the copolymer. As one skilled in the art will recognize, it is to be expected that the count of such ion mass units would increase with the amount of PEVE incorporated into the TFE/PEVE copolymer. Further, it is to be expected that the amount of oligomer present would vary with the MV of the bulk polymer, generally decreasing with increasing MV. Thus, a meaningful recitation of results by mass spectrometer analysis includes reference to MV and PEVE content. (See Examples 10–12.)

After the reactor is charged with water, surfactant, CTA (if used) and monomers, heated to the chosen temperature and agitation started, a solution of initiator is added at a prescribed rate to initiate polymerization. Thus the polymerization medium is formed as the polymerization reaction commences. A pressure drop is the usual indicator that polymerization has started. Then, TFE addition is started and controlled according to the scheme chosen to regulate the polymerization. An initiator solution, which can be the same as or different from the first initiator solution, is usually added throughout the reaction.

There are several alternatives for regulating the rate of TFE/PAVE copolymerization, and these are applicable for polymerizing the TFE/PEVE copolymers of this invention. It is common with most alternatives first to precharge at least part of the PEVE monomer and then to add TFE to the desired total pressure. Additional TFE is then added after initiator injection and reaction kickoff to maintain the chosen pressure, and additional PEVE may be added, also. The TFE may be added at a constant rate, with agitator speed changed as necessary to increase or decrease actual polymerization rate and thus to maintain constant total pressure. In a variant of this alternative, pressure may be varied to maintain constant reaction rate at constant TFE feed rate and constant agitator speed. Alternatively, the total pressure and the agitator speed may both be held constant, with TFE added as necessary to maintain the constant pressure. A third alternative is to carry out the polymerization in stages with variable agitator speed, but with steadily increasing TFE feed rates. When PEVE is added during the reaction, it is convenient to inject it at a fixed rate. Preferably, the rate of PEVE addition is uniform during a given phase of polymerization. However, one skilled in the art will appreciate that a wide variety of PEVE monomer addition programs can be employed. Thus, for example, a series of discrete PEVE additions can be used. Such discrete additions can be in equal or varying amounts, and at equal or varying intervals. Other non-uniform PEVE addition programs can be used.

One skilled in the art will recognize that one or more additional copolymerizable monomers can be introduced into the polymerization. Such additional monomer will be in minor amount with respect to the amount of PEVE when incorporated in the TFE/PEVE copolymers of this invention.

Any workable pressure can be used in aqueous processes to make the TFE/PEVE copolymers of this invention. High pressure offers an advantage over low pressure in increased reaction rate. However, the polymerization of TFE is highly exothermic, so high reaction rate increases the heat that must be removed or accommodated as temperature increases. Pressures that can be used are also determined by equipment design and by safety concerns in the handling of TFE. Generally, pressures in the range of about 0.3–7 MPa are known for dispersion polymerization of TFE copolymers, and pressures in the range 0.7–3.5 MPa are common. While it is common to maintain constant pressure in the reactor, pressure can be varied.

After dispersion polymerization is complete and raw (as-polymerized) dispersion has been discharged from the reactor, traditional techniques known in the art (see U.S. Pat. No. 5,266,639, for example) can be used to recover TFE/PEVE copolymer solids from the aqueous polymerization medium. For example, such methods as coagulation by vigorous agitation, optionally with added electrolyte, or by freezing and thawing, followed by separation of the wet solids from the liquid and then by drying can be used.

When made by aqueous dispersion polymerization, the TFE/PEVE copolymers of this invention can be used in dispersion form. The as-polymerized (raw) dispersion may be used as discharged from the reactor if it has adequate stability and/or wetting characteristics for the intended purpose. Alternatively, the raw dispersion can be adjusted by addition of surfactants, or concentrated and stabilized by techniques well known in the art. Other materials can be blended into the TFE/PEVE copolymer dispersions for use in dispersion form, or such blends can be co-coagulated as a step toward dry blends or filled resins. Small raw dispersion particle size (RDPS) typically obtained, e.g., 50–250 nm, contributes to stability with respect to settling and may make the dispersions particularly desirable for certain uses, such as impregnation and the formation of coherent films having small thickness.

The process of the present invention is capable of making copolymer having less than 3 wt % PEVE, e.g. as little as 2 wt %, but the higher PEVE content is preferred for most utilities. The copolymer can be fluorine treated to decrease the number of unstable end groups and then sparged with inert gas such as nitrogen to remove extractible fluoride from the copolymer, such treatments being disclosed in U.S. Pat. No. 4,743,658.

EXAMPLES

Fluoropolymer compositions were determined either using high temperature $^{19}F$ NMR spectroscopy or using Fourier transform infrared (FTIR) spectroscopy on 0.095–0.105 mm thick films pressed at 350° C. When using FTIR, an absorption band at 4.25 µm was used as an internal thickness standard. PEVE was determined from an infrared band at 9.17 µm and was calculated in wt % as 0.75 plus 1.28× the ratio of the 9.17 µm absorbance to the 4.25 µm absorbance. PMVE was determined from an infrared band at 11.2 µm and was calculated in wt % as 7× the ratio of the 11.2 µm absorbance to the 4.25 µm absorbance. PPVE was determined from an infrared band at 10.1 µm and was calculated in wt % as 0.97× the ratio of the 10.1 µm absorbance to the 4.25 µm absorbance.

Melt viscosities of the fluoropolymers were determined by ASTM method D1238-52T modified as described in U.S. Pat. No. 4,380,618.

Thermal characteristics of fluoropolymer resins were determined by DSC by the method of ASTM D-4591-87. The melting temperature reported is the peak temperature of the endotherm on first melting.

Average size of polymer particles as polymerized, i.e., raw dispersion particle size (RDPS), was measured by the turbidity method or by photon correlation spectroscopy.

The standard MIT folding endurance tester described in ASTM D-2176 was used for determining flex life (MIT Flex Life). Measurements were made using compression-molded films that were quenched in cold water. Film thickness was approximately 0.008 inch (0.20 mm). Reported values are the average of results for three samples, unless stated otherwise.

Tensile properties of TFE/PEVE copolymer resins were measured according to ASTM D-1708. Unless otherwise specified, such measurements were made at room temperature.

In the following, unless otherwise stated, stated solution concentrations are based on combined weight of solvent water and of solute(s). Stated concentrations of polymer solids in dispersions are based on combined weights of solids and aqueous medium, and were determined gravimetrically, i.e., by weighing dispersion, drying, and weighing dried solids.

Example 1

This example illustrates the copolymerization of TFE and PEVE in a fully aqueous medium to give a homogeneous copolymer in the form of a stable colloidal dispersion. A clean, horizontally disposed, water/steam jacketed, cylindrical stainless-steel autoclave having a capacity of 36.3 L and a length-to-diameter ratio of about 1.5:1, and equipped with a 4-bladed cage-type agitator, was charged with 23.6 kg of demineralized water. With the agitator turning at 50 rpm, the aqueous charge was heated to 65° C. and deairated by three times alternately evacuating and pressuring with TFE to 30 psig (0.31 MPa). The autoclave was cooled to 25° C. and again evacuated, and ethane was introduced to give a pressure rise of 8 inches (20.3 cm) of Hg. To the autoclave were added 160 mL of PEVE, 240 mL of a 20 wt % solution of C-8 in water, and 10 mL of concentrated ammonium hydroxide. The temperature was increased to 80° C. and the autoclave was pressured with TFE to 300 psig (2.2 MPa). The polymerization was initiated by pumping 200 mL of a solution of 2 g of APS in 1 L of water into the autoclave at a rate of 50 mL/min. Then, the injection rate of APS solution was reduced to 5 mL/min and was maintained at that rate throughout the batch. After the pressure of the autoclave had dropped 10 psig (0.069 Mpa), signaling kickoff, TFE was added to the autoclave to maintain pressure at 300 psig. When the rate of reaction (addition) of TFE reached 0.16 lb/min (0.072 kg/min), PEVE addition was begun at the rate of 1.5 mL/min and was continued at that rate to the end of the batch. The agitation rate was adjusted to maintain TFE feed rate at 0.16 lb/min. When 20 lb (9.08 kg) of TFE had been transferred to the autoclave after the initial pressuring step, the agitator and ingredient feeds were stopped and the reactor was slowly vented. After venting to nearly atmospheric pressure, the reactor was purged with nitrogen to remove residual monomer and aqueous dispersion weighing 78.5 lb (36.6 kg) was discharged. Solids content of the dispersion was 29.3 wt % and raw dispersion particle size (RDPS) was 112 nm. After mechanical coagulation, the polymer solids were pressed to eliminate excess water and were then dried in a 150° C. convection air oven. The TFE/PEVE copolymer resin had an MV of $8.6 \times 10^3$ Pa.s, a PEVE content of 3.0 wt %, and a melting point of 309° C. with heat of fusion of 43 J/g. MIT Flex Life was $16.5 \times 10^3$ cycles.

Examples 2–5

The procedure of Example 1 was essentially repeated, except that the precharged and pumped amounts of PEVE were varied as shown in Table 1. Example 2 was terminated before 20 lb of TFE had been transferred to the autoclave. Raw dispersion and copolymer resin properties are also summarized in Table 1. These examples show that increased amounts of PEVE can be incorporated into polymer, and the benefit to MIT Flex Life of increased PEVE. Based on PEVE content, Examples 4 and 5 were expected to have flex life exceeding that of Example 3, and MIT Flex Life was not measured.

TABLE 1

Conditions and Results for Examples 2–5

| | Example: | | | |
|---|---|---|---|---|
| | 2 | 3 | 4 | 5 |
| Run conditions: | | | | |
| PEVE precharge (mL) | 450 | 530 | 800 | 1050 |
| PEVE pumping (mL/min) | 4.0 | 4.5 | 6.5 | 8.0 |

TABLE 1-continued

Conditions and Results for Examples 2–5

| | Example: | | | |
|---|---|---|---|---|
| | 2 | 3 | 4 | 5 |
| Dispersion properties: | | | | |
| Solids (wt %) | 26.3 | 31.7 | 32.5 | 32.5 |
| RDPS (nm) | 127 | 122 | 107 | 92 |
| Resin properties: | | | | |
| MV ($10^3$ Pa · s) | 8.9 | 7.7 | 5.4 | 3.7 |
| PEVE content (wt %) | 9.4 | 10.1 | 14.1 | 17.4 |
| Melting point (°C.) | 280 | 278 | 265 | 256 |
| Heat of fusion (J/g) | 27 | 27 | 14 | 10 |
| MIT Flex Life ($10^3$ cycles) | 440 | 498 | — | — |
| Tensile strength (MPa) | 30.6 | 31.9 | 43.8 | 28.0 |
| Elongation at break (%) | 190 | 219 | 263 | 163 |

Examples 6–8

The procedure of Example 1 was essentially repeated, except that the precharged amount of PEVE was 500 mL, the subsequent PEVE pumping rate was 5 mL/min, no ammonium hydroxide was charged to the autoclave, and the initial amount and injection rate of the 2 g/L APS solution were varied as shown in Table 2. Raw dispersion and copolymer resin properties are also summarized in Table 1. The MIT Flex Life test for Example 7 was terminated at $2.4 \times 10^6$ cycles after ten days with no sign of impending failure to free the tester for other work, indicating the exceptional properties that can be attained with TFE/PEVE copolymers having high PEVE content. Based on MV, the flex life of Example 6 was expected to exceed that of Example 7 and was not tested. Tensile test results show excellent retention of tensile strength at high temperature.

TABLE 2

Conditions and Results for Examples 6–8

| | Example: | | |
|---|---|---|---|
| | 6 | 7 | 8 |
| Run conditions: | | | |
| APS solution precharge (mL) | 200 | 320 | 600 |
| APS solution pumping (mL/min) | 5 | 8 | 15 |
| Dispersion properties: | | | |
| Solids (wt %) | 30.8 | 29.3 | 37.8 |
| RDPS (nm) | 105 | 103 | 99 |
| Resin properties: | | | |
| MV ($10^3$ Pa · s) | 21.7 | 15.9 | 3.0 |
| PEVE content (wt %) | 9.1 | 10.0 | 8.6 |
| Melting point (°C.) | 279 | 278 | 283 |
| Heat of fusion (J/g) | 30 | 22 | 29 |
| MIT Flex Life ($10^3$ cycles) | — | >2400 | 190* |
| Tensile strength (MPa) | 28.4 | 31.6 | 29.2 |
| Elongation at break (%) | 254 | 275 | 315 |
| Tensile strength, 150° C. (MPa) | 22.2 | 16.2 | 14.0 |
| Elongation at break, 150° C. (%) | 416 | 408 | 457 |

*Average of two samples

Control A

The procedure of Example 1 was essentially repeated, except that perfluoro(methyl vinyl ether) (PMVE) was used instead of PEVE, the precharged amount of PMVE was 100 mL, the subsequent PMVE pumping rate was 6.7 mL/min, no ammonium hydroxide was charged to the autoclave, the APS solution concentration was 5 g/L, the initial charge of APS solution was 320 mL, and the injection rate of the APS solution was 8 mL/min. Solids content of the dispersion was 32.3 wt % and RDPS was 127 nm. The TFE/PMVE copolymer resin had an MV of $8.3\times10^3$ Pa.s, a PMVE content of 4.9 wt %, and bimodal melting with peaks at 282° C. and 309° C. with heat of fusion of 31 J/g. Tensile strength and elongation at break were 25.2 MPa and 361% at room temperature, and 8.7 MPa and 333% at 150° C. Retention of tensile strength at high temperature is not as good as for examples of the invention. MIT Flex Life was $14.3\times10^3$ cycles, lower than for the TFE/PEVE copolymer of Example 1 despite having higher PAVE content.

Control B

The procedure of Example 1 was essentially repeated, except that perfluoro(propyl vinyl ether) (PPVE) was used instead of PEVE, the precharged amount of PPVE was 850 mL, the subsequent PPVE pumping rate was 6.7 mL/min, no ammonium hydroxide was charged to the autoclave, ethane was introduced to give a pressure rise of 4 inches (10.2 cm) of Hg, the APS solution concentration was 1 g/L, the initial charge of APS solution was 250 mL, and the injection rate of the APS solution was 2 mL/min. Solids content of the dispersion was 32.8 wt % and RDPS was 96 nm. The TFE/PPVE copolymer resin had an MV of $2.0\times10^3$ Pa.s, a PPVE content of 16.8 wt %, and a melting point of 260° C. with heat of fusion of 20 J/g. Tensile strength and elongation at break were 30.3 MPa and 279% at room temperature, and 7.0 MPa and 549% at 150° C. The high temperature tensile strength is only half that of Example 8 despite having PAVE content nearly twice as high.

Example 9 and Control C

TFE/PEVE copolymer resin of Example 1 was evaluated by capillary rheometry at 400° C. using an Instron® capillary rheometer. Tungsten carbide dies with capillary diameter of 0.381 and 0.762 mm, and capillary length of 50.8 and 25.4 mm, respectively, and 90° entrance angle were used. By varying the rate of polymer extrusion through the capillary dies, shear rates in the range of from 10.4 $s^{-1}$ to 27,000 $s^{-1}$ were achieved. The extrudate was free from severe melt fracture for shear rates up to 3470 $s^{-1}$, beyond which the extrudate became grossly distorted. In contrast, a TFE/PPVE copolymer control resin having PPVE content of 3.6 wt %, and MV=$8.6\times10^3$ Pa.s exhibited severe melt fracture with the extrudate becoming grossly distorted at shear rates above 278 $s^{-1}$. This illustrates that the TFE/PEVE copolymer of this invention can be melt processed such as by extrusion, including injection molding, at high shear rate. Another embodiment of the present invention is the process comprising extruding TFE/PEVE copolymer containing at least 3 wt % of PEVE.

Examples 10–12 and Controls D–F

The procedure of Example 1 was essentially repeated, except that no ammonium hydroxide was added, PPVE was substituted for the PEVE in Controls D–F, the precharged and pumped amounts of PAVE were varied as shown in Table 3, the 240 mL of C-8 solution was diluted to 500 mL with additional water, the first addition of APS solution was 400 mL, and the pumping of PAVE was begun after kickoff. Raw dispersion and TFE/PAVE copolymer resin properties are also summarized in Table 3. In surprising contrast to the similar set of experiments in Examples 2–5, these results show that the unbuffered process of this invention can yield simultaneous increases in MV and in PEVE content of the copolymer. The expected behavior is illustrated by the results for Controls D–F, with MV decreasing with increasing PPVE.

A mass spectrometer analysis was used as an indicator of oligomer (fine particulate) content of the TFE/PAVE copolymer resins. In this procedure, a nominal 2-mg sample of resin (in this instance, as powder from coagulation and drying) was introduced to the solids probe of a Finnigan INCOS® 50 mass spectrometer. The sample was placed under full vacuum, the temperature was increased to 260° C. at the rate of 30° C./min, and the ions liberated by electron impact on the evolved volatile oligomers were separated and counted. Counts were accumulated for 10 min., measured from the start of heating. Specific ion mass units of 119 and 169, which represent the $C_2F_5^+$ and $C_3F_7^+$ side chain ions cleaved from PEVE and PPVE, respectively, have been found to be an indicator of the overall level of volatiles. These single ions, the major signals seen, are believed to be specific for volatile fluoropolymer fragments containing the respective PAVE. The cummulative counts of these ions were taken as representing the amounts of oligomer evolved from the respective samples. Results of these measurements, also shown in Table 3, indicate much lower evolved oligomer for the Examples relative to the Controls, despite PEVE content that is higher than PPVE content on a molar basis although at comparable content on a weight basis.

The mass spectrometer analysis procedure described above can be referred to as the Mass Spectrometer Test (MST), and the test result in terms of counts of specific ion mass units can be referred to as the Mass Spectrometer Test Count (MSTC). Preferably, the copolymer of the present invention has a MSTC for ion mass unit 119 of less than 400 counts/mg at MV of $7\times10^3$ Pa.s and PEVE content of 7 wt %, when the MST is performed on dry raw copolymer resin, i.e., resin that has been isolated from the polymerization medium but has not been extruded.

Example 13

The procedure of Example 11 was essentially repeated, except that the polymerization temperature was 70° C. Solids content of the dispersion was 30.9 wt % and RDPS was 179 nm. The TFE/PEVE copolymer resin had an MV of $40.4\times10^3$ Pa.s and a PEVE content of 10.2 wt %.

TABLE 3

Summary of Examples 10–12 and Controls D–F

| | Example: | | | | | |
|---|---|---|---|---|---|---|
| | 10 | 11 | 12 | D | E | F |
| Run conditions: | | | | | | |
| PAVE type | PEVE | PEVE | PEVE | PPVE | PPVE | PPVE |
| PAVE precharge (mL) | 240 | 400 | 490 | 240 | 400 | 590 |
| PAVE pumping (mL/min) | 1.9 | 2.5 | 3.2 | 1.9 | 2.5 | 3.2 |
| Dispersion properties: | | | | | | |
| Solids (wt %) | 29.5 | 30.3 | 30.2 | 29.9 | 26.2 | 31.6 |
| RDPS (nm) | 165 | 161 | — | 166 | 152 | 179 |

TABLE 3-continued

Summary of Examples 10–12 and Controls D–F

| | Example: | | | | | |
|---|---|---|---|---|---|---|
| | 10 | 11 | 12 | D | E | F |
| Resin properties: | | | | | | |
| MV ($10^3$ Pa · s) | 4.9 | 6.8 | 10.2 | 1.0 | 1.2 | 0.46 |
| PAVE content (wt %) | 4.6 | 7.6 | 11.1 | 4.6 | 7.7 | 11.3 |
| PAVE content (mol %) | 2.2 | 3.7 | 5.5 | 1.8 | 3.0 | 4.6 |
| Mass spectrum analysis: | | | | | | |
| Ion | $C_2F_5^+$ | $C_2F_5^+$ | $C_2F_5^+$ | $C_3F_7^+$ | $C_3F_7^+$ | $C_3F_7^+$ |
| Mass unit | 119 | 119 | 119 | 169 | 169 | 169 |
| Sample weight (mg) | 1.85 | 1.70 | 2.14 | 1.80 | 1.76 | 1.84 |
| Counts | 300 | 511 | 717 | 475 | 1146 | 1220 |
| Counts/mg | 162 | 301 | 335 | 264 | 651 | 663 |

We claim:

1. A copolymer consisting essentially of tetrafluoroethylene and at least 3% by weight of perfluoro(ethyl vinyl ether) and having a melt viscosity of no greater than $25 \times 10^3$ Pa.s at 372° C.

2. The copolymer of claim 1, wherein the amount of perfluoro(ethyl vinyl ether) is at least 4% by weight.

3. The copolymer of claim 1, wherein the amount of perfluoro(ethyl vinyl ether) is at least 8% by weight.

4. The copolymer of claim 1 having a melt viscosity of from $0.5 \times 10^3$ Pa.s to $25 \times 10^3$ Pa.s.

5. A copolymer consisting essentially of tetrafluoroethylene and at least 3% by weight of perfluoro(ethyl vinyl ether) and having a melt viscosity of no greater than $25 \times 10^3$ Pa.s at 372° C., said copolymer being made by solvent-free aqueous dispersion polymerization.

6. A copolymer consisting essentially of tetrafluoroethylene and at least 3% by weight of perfluoro(ethyl vinyl ether) and having a melt viscosity of from $1 \times 10^3$ Pa.s to $10 \times 10^3$ Pa.s at 372° C.

7. The copolymer of claim 6 wherein at least 10.5 wt % of said perfluoro(ethyl vinyl ether) is present.

8. The copolymer of claim 6 wherein up to 17.4 wt % of said perfluoro(ethyl vinyl ether) is present.

9. The copolymer of claim 6 wherein said melt viscosity is from 1.5 to $5 \times 10^3$ Pa.s.

10. The copolymer of claim 1 wherein up to 17.4 wt % of said perfluoro(ethyl vinyl ether) is present.

11. Process comprising extruding a copolymer consisting essentially of tetrafluoroethylene and at least 3% by weight of perfluoro(ethyl vinyl ether).

12. Process comprising forming a polymerization medium containing water, water-soluble polymerization initiator, and dispersing agent and copolymerizing tetrafluoroethylene and perfluoro(ethyl vinyl ether) in said medium to form an aqueous dispersion of tetrafluoroethylene/perfluoro(ethyl vinyl ether) copolymer particles in said medium, said copolymerization being carried out in the absence of alkaline buffer.

13. The process of claim 12 wherein said polymerization is carried out in the absence of organic solvent.

* * * * *

UNITED STATES PATENT AND TRADEMARK OFFICE
CERTIFICATE OF CORRECTION

PATENT NO. : 5,760,151
DATED : June 2, 1998
INVENTOR(S) : Aten et al.

It is certified that error appears in the above-identified patent and that said Letters Patent is hereby corrected as shown below:

On the cover page in Field [22] in place of "Filed: Jan. 2, 1996" should appear --Filed: Aug. 2, 1996--.

Signed and Sealed this

First Day of August, 2000

Attest:

Q. TODD DICKINSON

Attesting Officer

Director of Patents and Trademarks